April 23, 1929.  T. A. BRYSON  1,710,447
CENTRIFUGAL EXTRACTOR AND METHOD OF CENTRIFUGAL EXTRACTION
Filed Oct. 25, 1921   2 Sheets-Sheet 2
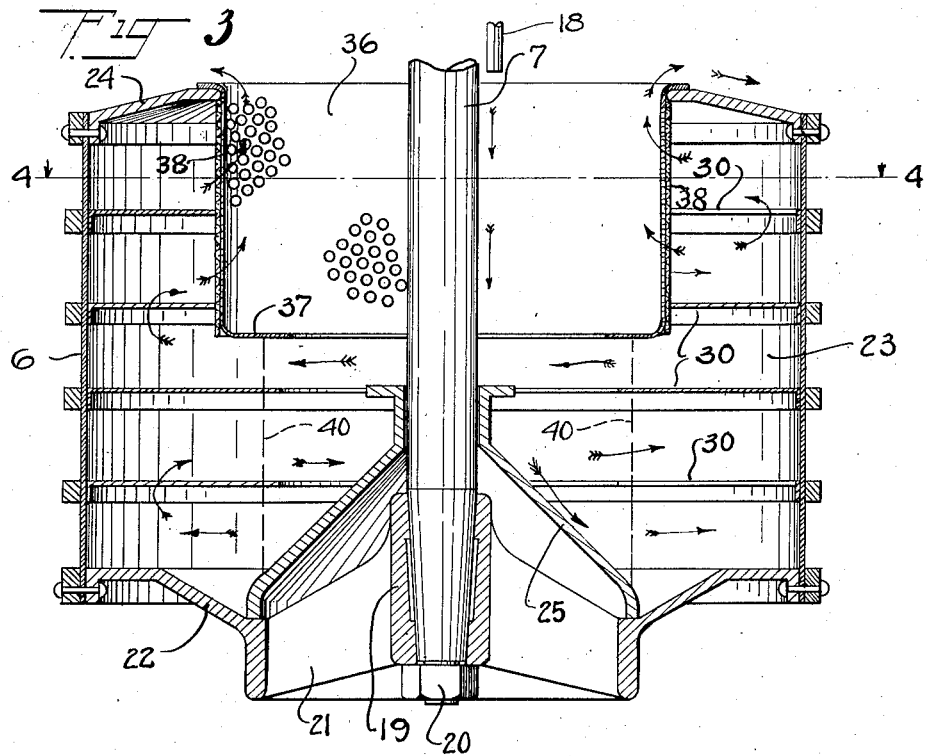
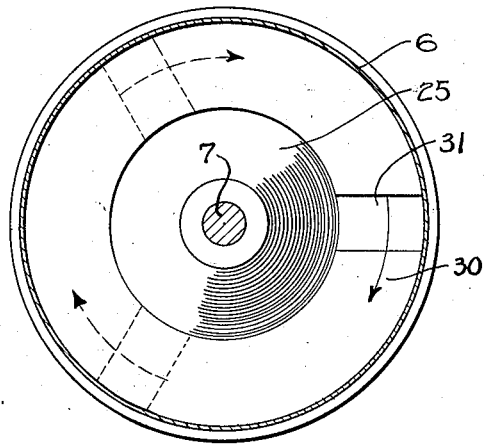 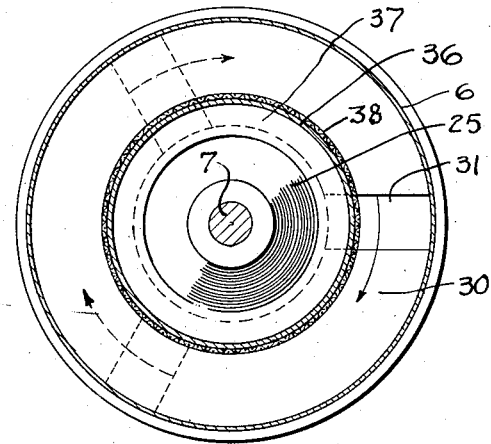
INVENTOR
Tandy A. Bryson
BY John D. Morgan
ATTORNEY Patented Apr. 23, 1929.

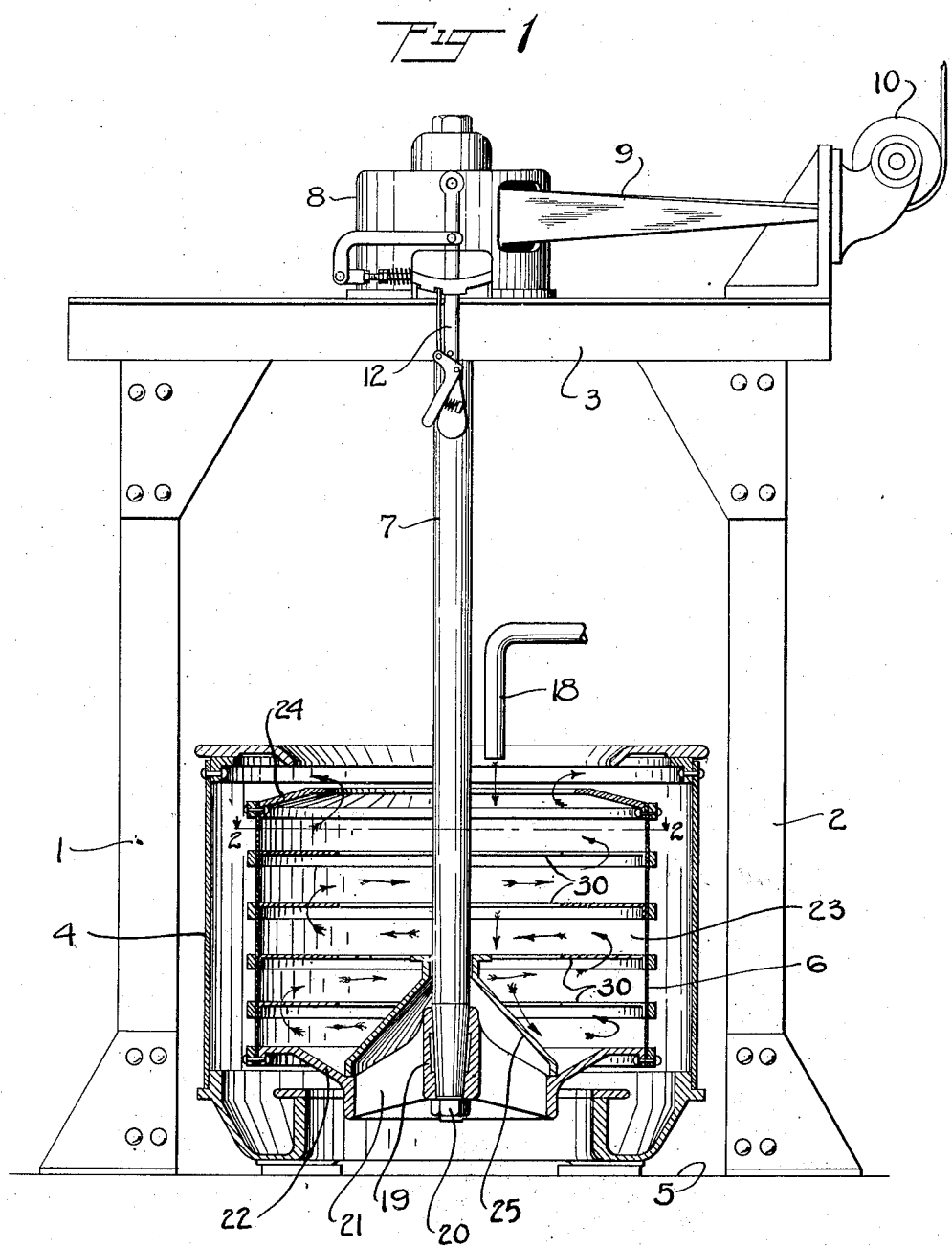

1,710,447

UNITED STATES PATENT OFFICE.

TANDY A. BRYSON, OF TROY, NEW YORK, ASSIGNOR, BY MESNE ASSIGNMENTS, TO TOLHURST MACHINE WORKS, INC., OF TROY, NEW YORK, A CORPORATION OF NEW YORK.

CENTRIFUGAL EXTRACTOR AND METHOD OF CENTRIFUGAL EXTRACTION.

Application filed October 25, 1921. Serial No. 510,344.

The invention relates to a machine and process for separating a liquid and solids in suspension therein, and more particularly to a novel machine and process for centrifugally separating the liquid and solids and discharging the separated liquid while retaining the solids in the machine.

Objects and advantages of the invention will be set forth in part hereinafter and in part will be obvious herefrom, or may be learned by practice with the invention, the same being realized and attained by means of the instrumentalities and combinations pointed out in the appended claims.
The invention consists in the novel steps, processes, parts, constructions, arrangements, combinations and improvements herein shown and described.

The accompanying drawings, referred to herein and constituting a part hereof, illustrate one embodiment of the invention, and a manner of carrying out the process, the same with the accompanying description serving to explain the principles of the invention.

Of the drawings:—

Fig. 1 is a central vertical section through an extractor embodying the invention, with the frame and certain other parts in elevation;

Fig. 2 is a full horizontal section taken on the line 2—2 of Fig. 1;

Fig. 3 is a central vertical section through a basket equipped with a screen or strainer for the liquid; and Fig. 4 is a full horizontal section taken on the line 4—4 of Fig. 3.

The invention provides a centrifugal extractor for separating a liquid and solid matter in suspension therein, the solids being retained and the clarified liquid being discharged by the centrifugal action, the liquid being compelled to travel in a comparatively thin stream or streams for a relatively long circumferential distance compared with the flow or progress of the liquid axially, and preferably without any flow of the liquid in a radial direction. That is, the liquid is subjected to a very long flow in a relatively thin stream while subjected to the centrifugal action, and is preferably restrained from radial flow while its axial flow is closely controlled and is relatively very small as compared to the lineal or circumferential flow of the liquid.

Another object of the invention is to effect the separation of a liquid intermixture containing solid particles by restricting axial flow of the intermixture while same is under centrifugal action, thereby prolonging the centrifugal action so as to effect the separation of the solids and flowing off a separated liquid. While the intermixture is under centrifugal action, I permit only restricted axial flow of the rotating intermixture and thereafter cause one of the liquids to flow away after it is separated.

The remaining objects and features will be set out later in connection with the detailed description, and it will be understood that the foregoing and also the following description is explanatory and exemplary and is not restrictive of the invention.

Referring now in detail to the present preferred embodiment, illustrated by way of example in the accompanying drawings, and in accordance with certain features of the invention, the invention is applied to a centrifugal machine of the overhead suspended type, although so far as concerns other features of the invention it may be applied to other types of centrifugals.

In said illustrated form, a supporting frame is provided having uprights 1 and 2 and a horizontal cross-piece 3 supported upon the upper ends thereof. The centrifugal extractor comprises broadly a casing 4, which is preferably mounted in stationary position upon the floor 5, and is provided with any suitable means for carrying away or discharging the clarified separated liquid which is discharged from the basket or bowl 6 thereinto.

The basket or bowl 6 is suspended from, and rotated by, a shaft 7, which shaft is preferably resiliently mounted, to have also angular or gyratory movement with an unbalanced load, in any suitable supporting bearing, such bearing having connected therewith, or adjacent thereto, any suitable or desired form of driving means for the shaft 7. The enclosing housing for the bearing is shown at 8, and a belt 9 extends from the housing around guide pulley 10 and to any suitable driving means (not shown). A brake mechanism 12 is likewise preferably provided.

The liquid to be clarified is supplied in a suitable manner, and as embodied, a supply pipe 18 discharges downwardly and centrally into the bowl or basket 6, close to the shaft 7. The bowl 6 is provided at its bottom end with a central bearing hub 19, fastened on the bottom end of the shaft 7 in any suitable manner, as by a nut 20. The separated solid materials are preferably discharged from the central bottom portion of the bowl. Spider arms 21 extend radially from the hub 19, the spaces therebetween serving as the discharge openings. Carried by the outer ends of the spider arm 21 is the bottom 22 of the bowl. The side wall 23 of the bowl is imperforate and preferably cylindrical.

Means are provided for determining the depth or thickness of the wall of liquid which is subjected to the centrifugal action in the bowl 6, and as embodied, an inwardly projecting flange or shelf 24 is provided at the top of the bowl, the clarified or separated liquid flowing upwardly and outwardly over the inner edge thereof into the casing 4 and is then discharged therefrom. A valve 25 is provided as a closure for the discharge openings for the solids in the bottom of the bowl 6.

In the embodied form of means for controlling the hereinbefore described flow and action of the liquid during the centrifugal action, a plurality of flat annular baffle plates 30, preferably horizontally disposed, are provided, the outer periphery of these baffles abutting on the vertical cylindrical wall 23 of the bowl 6. The width or radial extent of the baffles 30 is preferably such that they extend radially inwardly a greater distance than the flange or shelf 24, and when so constructed they constitute means for preventing axial flow or currents in the liquid under centrifugal action, thereby preventing intermixture and consequent contamination of the inner separated or clarified liquid with the outward and denser and contaminated liquid, and likewise contributing largely to stabilizing the machine against gyration or angular displacement when the resilient form of suspension is employed. The flange or shelf 24, as indicated determines the depth or thickness of the wall of liquid within the bowl 6 and when the baffles 30 extend inwardly a greater radial distance than the lip or shelf 24 there is no axial flow of the liquid internally past a baffle.

The precise number of baffles employed, broadly considered, is immaterial, but the greater the number employed the longer the lineal flow which is imposed upon the liquid while under centrifugal action, and the smaller the stream into which the liquid is divided while so flowing, and consequently the more extended and thorough the separating action.

In the embodied form of means for permitting the axial flow in connection with the means for directing the lined or circumferential flow already described, the baffles 30 are imperforate except at preferably a single point, where there is an opening 31 therethrough, whereby the liquid may flow upwardly or in a general axial direction past the baffle plate 30. These openings 31 may be placed at various points as desired, but preferably are placed so as to give substantially or approximately the maximum lineal or circumferential flow beneath each baffle plate 30.

In many cases and with many liquids to be separated, I wish to avoid forcing the liquid, or the various particles thereof, radially so that it may escape upwardly. I provide means whereby no matter where a particle may be in the depth of fluid, it may escape by moving circumferentially and vertically without any radial movement thereof, except as such particle is impelled to radial movement due to centrifugal force or action.

This is effected in the present embodiment by making the openings 31 in the baffle plates 30 equal or nearly equal to the entire width, or radial extent, of the baffle plate, as is clearly shown in all the figures of the drawing. The passages or openings 31 are also proportioned to limit the upward flow of the liquid to a comparatively small sector of the annulus formed by its baffle plate, as shown in Figs. 2 and 4.

The particles therefore travel upwardly in a substantially helical path, winding about the axis of the basket shaft. The radial distance of a given particle from the basket shaft during its helical travel is substantially constant.

In certain cases, or with certain liquids or solutions, it is desirable to finally filter or strain the clarified liquid before it is discharged, as in certain cases, there may be in suspension in the liquid some substance, such as an exceedingly finely divided solid which is not entirely separated even by the unusually extensive and thorough centrifugal action of my invention, although such a condition in practice would be very rare and unusual.

Accordingly, in pursuance to one feature of the invention, there is provided, in cooperation with the current controlling and directing means already described, a suitable form of filtering means acting in the manner described. As preferably embodied, a cylindrical filtering member 36 is supported upon and extends downwardly within the lip or shelf 24 of the bowl 6, and preferably abuts upon and acts as a closure against the inner peripheral edge of one or more of the upper baffles 30. In view of the fact that the filter 36 will cause a certain amount of backpressure due to the forcing of the liquid therethrough, the wall of liquid 40 below the screen or filter 36 will be thicker than around the filter, the difference in thickness being proportional to the amount of pressure necessary to overcome the resistance of the filter to the flow of the liquid therethrough.

As embodied, the filter 38 is preferably provided with a reenforcing cylindrical perforate plate 36, which supports the filter against the fluid pressure while permitting the filtered fluid to pass through freely. At the bottom end of the filter 38, and conveniently integral with, or attached to, the supporting plate 36, there is a flat angular imperforate baffle plate 37, the outer periphery of which is joined to the bottom end of the cylindrical plate 36. The baffle 37 serves to prevent upward axial flow from this thicker portion of the wall of liquid without its passing through the filter. The baffles 30 are also of greater radial extent below the filter, to maintain their rleation to the wall of liquid within the bowl 6, so as to prevent axial flow past the inward periphery of the baffles and to compel all of the liquid to take the long and prescribed path already described.

With the manner described of directing and controlling the liquid, there is a longer lineal and circumferential flow of the liquid under centrifugal action, while the axial flow is relatively exceedingly small. There is also a greatly reduced velocity of the flow through the bowl, which conduces greatly to complete separation of the solids, especially the more finely-divided solids and those of lesser specific gravity.

There is also less direct exit of the liquid, and the bowl is not clogged at as early a stage in the collection or separation of the solids. Nor will the lower baffles become clogged with the solids and leave or create conditions of instability in the upper part of the device.

Also in the manner of procedure described, I do not force clarified or separated liquid into close contact or admixture with the precipitated or separated solids or with the outer, denser parts of the liquid.

A very important advantage of the invention is that it promotes in a most effective manner the stability of the machine, when a resilient suspension or mounting is employed, by preventing or counteracting the angular movement, or tendency to such movement, of the bowl and its shaft, by controlling the position of the inner surface of the liquid and the relation or relative position of the mass, or center of mass, of the liquid to the bowl and shaft. Also, vertical surging of the liquid is eliminated and this likewise conduces to more complete and effective settling action.

It will be understood that the invention is not limited to the details of construction and procedure herein illustrated and described, but that departures may be made thereform within the scope of the accompanying claims, without departing from the principles of the invention and without sacrificing its chief advantages.

What I claim is:—

1. A centrifugal extractor comprising in combination a rotating basket, and a plurality of horizontally disposed annular baffles in the basket, the spaces between the baffles being unobstructed circumferentially, each baffle having an opening therethrough extending substantially from the outer edge to the inner edge thereof, the openings in the baffles having different angular positions with respect to the axis of rotation of the basket.

2. A centrifugal extractor comprising in combination a rotating basket, and a plurality of horizontally disposed annular baffles in the basket, the spaces between the baffles being unobstructed circumferentially, each baffle having an opening therethrough extending substantially from the outer edge to the inner edge thereof, the openings in the baffles having different angular positions with respect to the axis of rotation of the basket, each baffle extending inwardly through the substantially vertical liquid wall formed when the basket rotates at high speed.

3. A centrifugal extractor comprising in combination a rotating basket, and a plurality of horizontally disposed annular baffles in the basket, each baffle having an opening therethrough, each opening being in a different vertical plane from the opening in the adjacent baffle, each baffle being of a width to extend inwardly through the substantially vertical liquid wall formed when the basket rotates at high speed.

4. A centrifugal extractor comprising in combination a rotating basket, a flange at the upper part of the basket determining the position of the substantially vertical wall formed when the basket rotates at high speed, and a plurality of spaced, annular baffles positioned in the basket, each having an opening therethrough extending substantially radially from the outer edge to the inner edge thereof, the inner edge of each baffle being a less distance from the axis of the basket than the inner edge of the flange.

5. A centrifugal extractor comprising in combination a basket with an imperforate cylindrical wall, a flange extending inwardly from the top of the basket, determining the horizontal thickness of the wall of confined liquid, a plurality of horizontal baffles spaced apart and extending inwardly from the wall of the basket beyond the inside surface of the wall of confined liquid, openings in the baffles permitting the passage of liquid therethrough, said openings being variously angularly positioned to give approximately the longest path of travel to liquid flowing upwardly for discharge at the top of the basket.

6. A centrifugal extractor comprising in combination a basket with an imperforate cylindrical wall, a flange extending inwardly from the top of the basket, determining the horizontal thickness of the wall of confined liquid, a plurality of horizontal baffles spaced apart and extending inwardly from the wall of the basket beyond the inside surface of the wall of confined liquid, openings in the baffles permitting the passage of liquid therethrough, said openings being variously angularly positioned to cause particles of liquid to flow upwardly in a substantially helical path, the axis of the helix being at substantially the axis of rotation of the basket.

7. A centrifugal extractor comprising in combination a rotating basket mounted to have angular or gyratory movement, and a plurality of annular baffles within the basket, each baffle having a radial opening therethrough in a different vertical plane from the opening in the adjacent baffle whereby a circumferential flow of material is induced, the baffles preventing surging of the liquid in the basket during gyratory movement thereof.

8. A centrifugal extractor comprising in combination a rotating basket mounted to have angular or gyratory movement, and a plurality of spaced, horizontally disposed annular baffles in the basket, each baffle having an opening therethrough extending from the outer edge to the inner edge thereof, which openings occupy different angular positions about the basket shaft, the baffles causing a circumferential flow of liquid between the baffles further serving to prevent surging of the liquid during the gyratory movement thereof.

9. A centrifugal extractor comprising in combination a rotating basket mounted to have angular or gyratory movement, a plurality of spaced, horizontally disposed annular baffles in the basket, each baffle having an opening therethrough extending from the outer edge to the inner edge thereof, adjacent openings being out of alinement, the baffle being of a width such that the inner edge projects through and inwardly of the substantially vertical wall of liquid formed when the basket rotates at high speed.

10. A centrifugal extractor comprising in combination a rotating basket, an annular flange at the top of the basket over which liquid flows and escapes from the basket, the inner edge of said flange determining the position of the substantially vertical wall of liquid formed when the basket rotates at high speed, and a plurality of spaced, horizontally disposed annular baffles in the basket, the inner edges of which extend farther inwardly than the inner edge of said flange so as to project through the said vertical liquid wall, each baffle having an opening therethrough, each opening being in a different vertical plane from the opening in the adjacent baffle.

11. A centrifugal extractor comprising in combination a rotating basket, an annular flange at the top of the basket over which liquid flows and escapes from the basket, the inner edge of said flange determining the position of the substantially vertical wall of liquid formed when the basket rotates at high speed, and a plurality of spaced, horizontally disposed annular baffles in the basket, the inner edges of which extend farther inwardly than the inner edge of said flange so as to project through the said vertical liquid wall, each baffle having an opening therethrough, each opening being in a different vertical plane from the opening in the adjacent baffle, and each opening extending in a substantially radial direction from the outer edge of the baffle to the inner edge thereof.

12. A centrifugal extractor comprising in combination a rotating basket mounted for gyratory movement, a flange at the top of the basket, a plurality of spaced, horizontally disposed annular baffles in the basket, the inner edge of each baffle extending further inwardly than the edge of said flange so as to project through the vertical wall of liquid formed when the basket rotates at high speed, each baffle having a radially disposed opening therethrough extending from the outer edge to the inner edge of the baffle, each opening being in a different vertical plane from the opening in the adjacent baffle, and a vertically movable valve in the bottom of the basket.

13. A centrifugal extractor comprising in combination a rotating basket, a plurality of horizontally disposed annular baffles in the basket, the spaces between the baffles being unobstructed circumferentially, each baffle having an opening therethrough extending substantially from the outer edge to the inner edge thereof, the openings in the baffles having different angular positions with respect to the axis of rotation of the basket, and a vertically disposed filter positioned near the top of the basket.

14. A centrifugal extractor comprising in combination a rotating basket, a plurality of horizontally disposed annular baffles located in the basket, each baffle having an opening therethrough, each opening being in a different vertical plane from the openings in adjacent baffles, the baffles being of a width so that their inner edges extend through and inwardly of the substantially vertical liquid wall formed when the basket rotates at high speed, and a filter near the top of the basket having a vertically disposed wall further out from the basket shaft than the inner edges of the baffles.

15. The process of centrifugally separating a liquid intermixture which comprises maintaining a cylindrical body of the liquid undergoing centrifugal action, permitting restricted flow of the liquid in a general axial direction and causing one of the intermixed materials to flow away after it has been separated and retaining another separated liquid component in the cylindrical body.

16. The process of centrifugally separating a liquid intermixture containing solid particles which comprises maintaining a cylindrical body of the liquid undergoing centrifugal action, preventing radial flow of the intermixture, permitting restricted flow of the liquid in a general axial direction and causing one of the intermixed materials to flow away after it has been separated.

17. The process of centrifugally separating a liquid intermixture containing solid particles which comprises maintaining a cylindrical body of the liquid undergoing centrifugal action, causing a restricted flow at different places angularly and longitudinally of said cylindrical body, and causing one of the intermixed materials to flow away after it has been separated, and intermittently discharging a separated solid material.

18. The process of centrifugally separating a liquid intermixture which comprises subjecting a predetermined but progressively changing body of the intermixture to a relatively large rotational centrifugal separating action and to a simultaneous flow which is relatively small and having an upward axial component which is displaced successively angularly of the body of the intermixture, and flowing off a separated liquid.

19. The process of centrifugally separating a liquid intermixture which comprises subjecting a predetermined quantity of the materials to rotational movement to effect separation centrifugally and causing a substantially helical flow of the material to renew said quantity undergoing separation and to discharge a separated fluid while retaining a heavier separated fluid.

20. The process of centrifugally separating a liquid intermixture containing solid particles which comprises subjecting a predetermined quantity of the materials to centrifugal separating action, controlling fluent movement thereof in a non-radial direction to protract the period of the centrifugal action, and flowing off a separated component.

21. The process of centrifugally separating a liquid intermixture containing solid particles which comprises subjecting a body of the liquid to centrifugal action and restricting axial flow of the intermixture thereby subjecting it to a sufficiently prolonged centrifugal action and flowing off a separated liquid.

22. The process of centrifugally separating a liquid intermixture which comprises maintaining a cylindrical body of the liquid undergoing centrifugal action permitting restricted upward axial flow of the rotating intermixture and causing one of the intermixed liquids to discharge in the direction of axial flow after it has been separated.

23. The process of centrifugally separating a liquid intermixture which comprises maintaining a cylindrical body of the liquid undergoing centrifugal action, permitting restricted upward axial flow of the rotating intermixture and causing one of the intermixed liquids to flow away after it has been separated.

24. The process of centrifugally separating a liquid intermixture which comprises rotating a receptacle containing the liquid at a high speed, and restricting the axial flow of the liquid generated by the rotation to subject the liquid to the centrifugal separating action for a prolonged determinable period.

25. The process of centrifugally separating a liquid intermixture which comprises rotating a receptacle containing the liquid at a high speed, generally preventing the axial flow of the liquid generated by rotation, and causing a restricted flow at a plurality of different places angularly and longitudinally of the cylindrical body of liquid generated by the rotation.

26. The process of centrifugally separating a liquid intermixture which comprises rotating a receptacle containing the liquid at a high speed, generally preventing the axial flow of the liquid generated by rotation, and causing a restricted flow at a plurality of different places angularly and longitudinally of the cylindrical body of liquid generated by the rotation and flowing off a separated component of the liquid intermixture.

27. The process of centrifugally separating a liquid intermixture which comprises rotating a receptacle containing the liquid at a high speed, generally preventing the axial flow of the liquid generated by rotation, and causing a restricted flow at a plurality of different places angularly and longitudinally of the cylindrical body of liquid generated by the rotation and discharging a separated component of the liquid intermixture from the receptacle by continued axial movement.

28. The process of centrifugally separating a liquid intermixture which comprises rotating a receptacle containing the liquid at a high speed, and restricting the axial flow of the liquid generated by the rotation to subject the liquid to the centrifugal separating action for a prolonged determinable period, and removing the axial restriction to permit discharge of a separated material.

29. The process of centrifugally separating a liquid intermixture which comprises maintaining a cylindrical body of the liquid undergoing centrifugal action preventing radial flow of the intermixture, permitting restricted upward axial flow of the rotating intermixture and causing one of the intermixed liquids to discharge in the direction of axial flow after it has been separated.

30. The process of centrifugally separating a liquid intermixture which comprises rotating a receptacle containing the liquid at a high speed preventing radial flow of the intermixture, and restricting the axial flow of the liquid generated by the rotation to subject the liquid to the centrifugal separating action for a prolonged determinable period.

31. The process of centrifugally separating a liquid intermixture which comprises maintaining a cylindrical body of the liquid undergoing centrifugal action, feeding intermixed materials substantially at the hollow center of the cylindrical body, generally preventing the upward axial flow of the liquid generated by rotation, and permitting a restricted upward flow at different places angularly and longitudinally of the cylindrical body.

32. The process of centrifugally separating a liquid intermixture which comprises maintaining a cylindrical body of the liquid undergoing centrifugal action, feeding intermixed materials substantially at the hollow center of the cylindrical body, generally preventing the upward axial flow of the liquid generated by rotation, and permitting a restricted upward flow at different places angularly and longitudinally of the cylindrical body, and removing the axial restriction at the top of the cylindrical body to discharge a separated component.

33. The process of centrifugally separating a liquid intermixture which comprises maintaining a cylindrical body of the liquid undergoing centrifugal action, feeding intermixed materials substantially at the hollow center of the cylindrical body, generally preventing the upward axial flow of the liquid generated by rotation, and permitting a restricted upward flow at different places angularly and longitudinally of the cylindrical body, partially removing the axial restriction at the top of the cylindrical body to discharge a separated component, and discharging another separated component at the bottom of the cylindrical body.

34. The process of centrifugally separating a liquid intermixture which comprises rotating a receptacle containing the liquid at a high speed, feeding intermixed materials downward at the hollow center of the cylindrical body of liquid undergoing centrifugal separation, preventing radial flow of the intermixture, permitting restricted upward flow of the liquid, and permitting one of the separated liquid components to discharge at the top of the receptacle.

35. The process of centrifugally separating a liquid intermixture which comprises rotating a receptacle containing the liquid at a high speed, feeding intermixed materials downward at the hollow center of the cylindrical body of liquid undergoing centrifugal separation, preventing radial flow of the intermixture, permitting restricted upward flow of the liquid, permitting one of the separated liquid components to discharge at the top of the receptacle and discharging a separated solid component at the bottom of the receptacle.

In testimony whereof, I have signed my name to this specification.

TANDY A. BRYSON.